United States Patent [19]

Maughmer

[11] 4,318,300
[45] Mar. 9, 1982

[54] LOW COST SELF ALIGNING STRAPDOWN ATTITUDE AND HEADING REFERENCE SYSTEM

[75] Inventor: Robert W. Maughmer, Calabasas Park, Calif.

[73] Assignee: Litton Systems, Inc., Beverly Hills, Calif.

[21] Appl. No.: 112,247

[22] Filed: Jan. 14, 1980

Related U.S. Application Data

[63] Continuation of Ser. No. 965,004, Nov. 30, 1978, abandoned.

[51] Int. Cl.³ .............................................. G01C 21/00
[52] U.S. Cl. .................................. 73/178 R; 364/453
[58] Field of Search ..................... 73/178 R; 33/326; 364/453, 454

[56] References Cited

U.S. PATENT DOCUMENTS

| | | | |
|---|---|---|---|
| 2,968,957 | 1/1961 | Condie et al. | 364/454 |
| 3,028,592 | 4/1962 | Parr et al. | 364/454 |
| 3,269,179 | 8/1966 | Anderson | 73/178 R |
| 3,272,972 | 9/1966 | Yamron et al. | 364/453 |
| 4,212,443 | 7/1980 | Duncan et al. | 73/178 R |

Primary Examiner—Donald O. Woodiel
Attorney, Agent, or Firm—Roy L. Brown

[57] ABSTRACT

Apparatus including two two-degree-of-freedom gyroscopes and at least two accelerometers mounted on a turntable on a vehicle. The turntable can be positioned about a vehicle vertical axis in one or the other of two positions 180 degrees apart for alignment. After alignment, the turntable is caged into its zero degree position, and the instruments thereafter operate in a strapdown mode with the yaw, roll and pitch angles of the vehicle computed by computer mechanisms which are sensitive to signals from the gyroscopes and accelerometers.

11 Claims, 18 Drawing Figures

LOW COST SELF ALIGNING STRAPDOWN ATTITUDE AND HEADING REFERENCE SYSTEM

This is a continuation of application Ser. No. 965,044, filed Nov. 30, 1978, now abandoned.

FIELD OF THE INVENTION

This invention pertains to automatic heading reference apparatus utilizing gyroscopes and accelerometers strapped down to a supporting vehicle and computing means to produce signals in earth-fixed coordinates.

BACKGROUND OF THE INVENTION

Previously known reference apparatus require an external heading reference, usually magnetic, to establish and maintain heading, the accuracy being limited to that of the external source. Prior art includes:

(1) A platform is supported on gimbals relative to the vehicle, and the platform is held locally level by signals from gyroscopes and accelerometers.

(2) A single gyroscope is used and is suspended on gimbals with its spin axis vertical or horizontal. It is held in place, and its output signals are used to produce usable signals.

(3) Angular rates are supplied indirectly through gimbal resolvers.

BRIEF SUMMARY OF THE INVENTION

The apparatus of this invention uses a turntable which is pivoted for rotation about a yaw or azimuth "Z" axis in a vehicle. The turntable is motor driven between a predetermined zero degree position and a 180 degree position by a motor and gear drive. Detents at the zero and 180 degree positions precisely position the turntable.

Positioned upon the turntable are two two-degree-of-freedom gyroscopes and at least two accelerometers. The gyroscopes are aligned to generate angular rate signals about x and y axes normal to the z axis and about the z axis. The accelerometers are aligned to measure acceleration in the direction of the x and y axes. Optionally a third accelerometer measures acceleration along the z axis.

Gyroscope biasing errors and the initial tilt of the gyroscopes relative to gravity are first determined by measuring the outputs of the sensors of the gyroscopes and the accelerometers first in a zero, then in a 180 degree rotation, with the turntable first in the zero then in the 180 degree position.

After initial alignment, the outputs of the gyroscope and accelerometer sensors are delivered to computing means to subtract out errors in the signals and to resolve the signals into earth coordinates.

The resolved signals may then be used either by an operator or an autopilot to control a vehicle such as a helicopter, airplane, tank or truck.

It is therefore an object of this invention to produce signals which are measures of angular rate and angular position of a vehicle relative to an earth-fixed set of rectangular coordinates.

It is a more specific object of this invention to achieve the above named objects where the earth fixed set of coordinates are north-south, east-west and vertical.

Other objects will become apparent from the following description taken together with the accompanying drawings.

It is also an object of this invention to supply an accurate self aligning attitude and heading reference system at low cost, regardless of initial starting temperature.

DETAILED DESCRIPTION OF THE INVENTION

Figure 1:
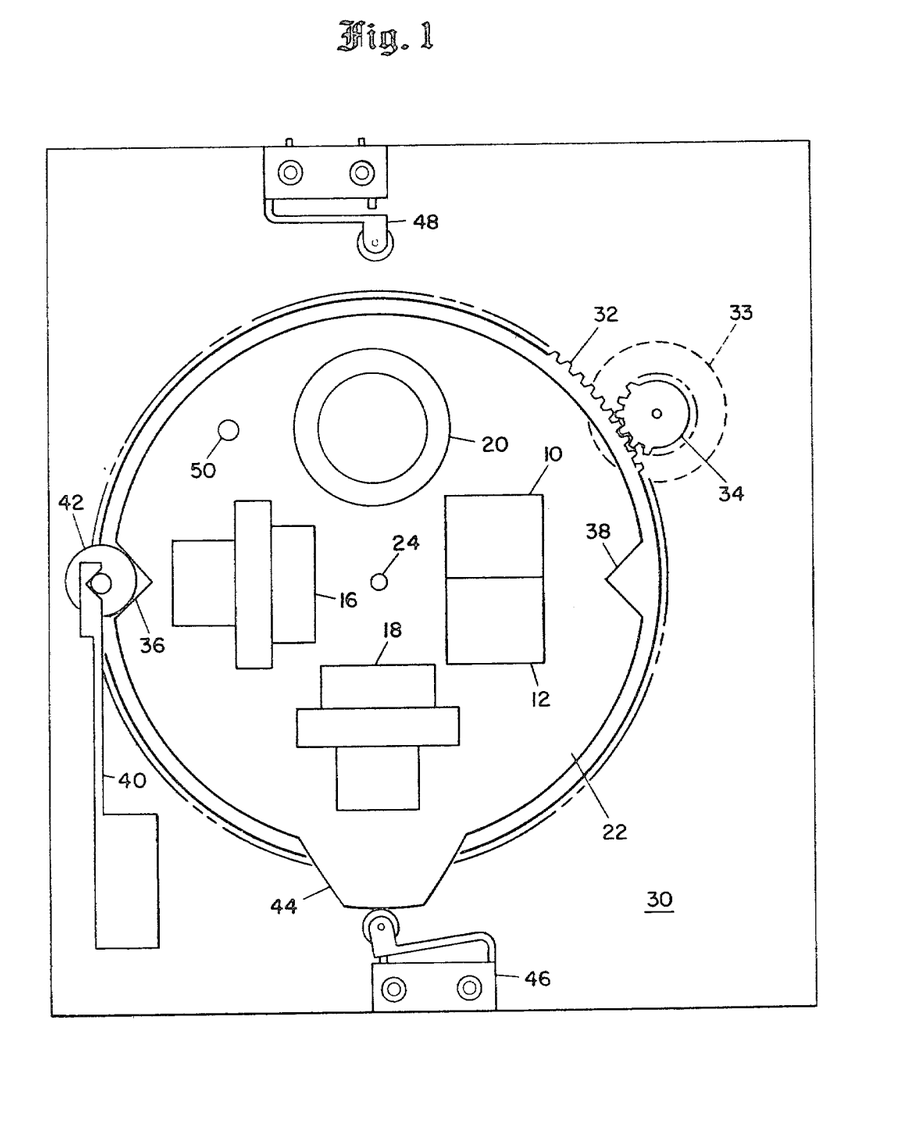
FIG. 1 shows a plan view of a turntable mounted for rotation about one axis relative to a vehicle and the gyroscopes, accelerometers and temperature sensor mounted thereon.

The apparatus of the invention comprises two two-axes angular rate sensors 10, 12 such as two-degree-of-freedom gyroscopes, each for generating angular rate signals which are measures of angular rate about two perpendicular axes. At least two, and preferably three, lineal acceleration measuring devices, 16, 18, 20 such as accelerometers for generating signals which are measures of lineal acceleration, are positioned with their sensing axes forming an orthogonal set of axes. The rate sensors 10, 12 and accelerometers 16, 18, 20 are fixedly mounted on a turntable 22 having a rotation axis 24. The accelerometers 16, 18, 20 are positioned with the sensing axis of accelerometer 20 defining an axis parallel to the axis 24. The sensing axes of each of the angular rate sensors 10, 12 are parallel to the sensing axes of accelerometers 16, 18 and 20.

The turntable 22 can be turned about the axis 24 relative to the supporting vehicle 30. The periphery of the turntable 22 has gear teeth 32 thereon to engage a spur gear 34 which is driven by a motor 33. Detents 36, 38 are positioned on opposite ends of a diameter of the turntable 22. A flexible pawl 40 has a roller 42 on the end thereof to roll on the periphery of the turntable 22 and to fit into the V-shaped detents 36, 38 to hold the turntable in each of two precisely aligned positions 180 degrees apart. A raised tab 44 engages micro-switches 46, 48 to stop the drive motor 33 of spur gear 34 when the roller 42 engages the detents 36, 38.

A right-handed set of orthogonal axes is defined in the vehicle 30 with the z axis coinciding with axis 24. Customarily the x, y and z axes are called the pitch, roll and yaw axes of the vehicle.

Figure 2A:
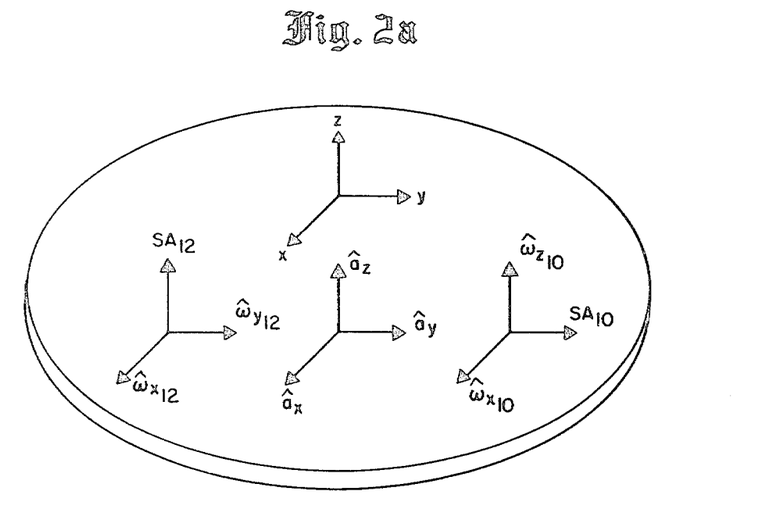
FIG. 2A is a schematic diagram of an alternative embodiment of the invention.
Figure 2B:
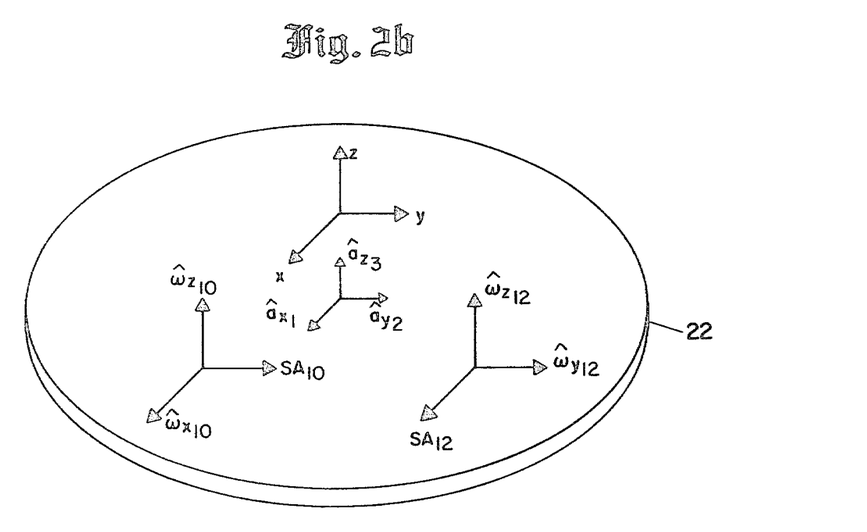
FIG. 2B is a schematic diagram of a preferred embodiment of the invention.

The sensing axes of the gyroscopes 10, 12 and the accelerometers 16, 18, 20 are initially oriented as shown in FIG. 2B.

The sensing axis $\hat{\omega}_{z10}$ is parallel to the z axis. With the turntable 22 as shown, its spin axis $SA_{10}$ and its other sensing axis $\hat{\omega}_{x10}$ are parallel to the y and x axes respectively.

The sensing axis $\hat{\omega}_{z12}$ is parallel to the z axis. With the turntable 22 as shown, its other sensing axis $\hat{\omega}_{y12}$ and its spin axis $SA_{12}$ are parallel to the y and x axes, respectively.

In an alternative embodiment (shown in FIG. 2A), the spin axis $SA_{12}$ is parallel to the z axis. With the turntable in a first position, its sensing axis $\hat{\omega}_{x12}$ and $\hat{\omega}_{y12}$ are parallel to the x and y axes, respectively.

With the turntable positioned as shown in FIGS. 2B and 2A, the accelerometer 16 senses acceleration $\hat{A}_x$ in the x direction, the accelerometer 18 senses acceleration $\hat{A}_y$ in the y direction, and the accelerometer 20 senses acceleration $\hat{A}_z$ in the z direction.

A ∧ symbol over another symbol indicates that the other symbol represents a measured signal.

Figure 3A:
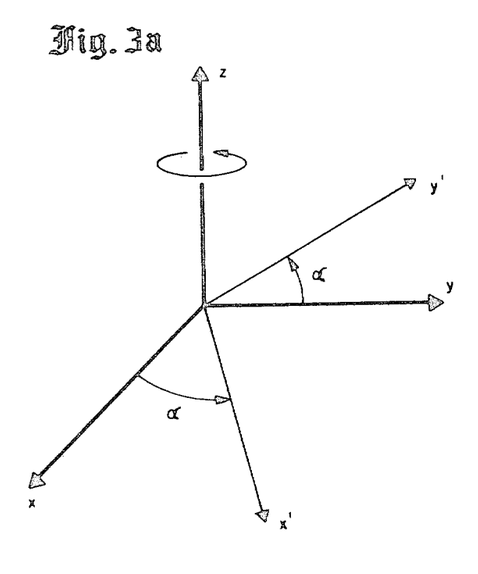
FIGS. 3A, 3B, 3C show a schematic rotation of coordinates through a set of Euler angles.
Figure 3B:
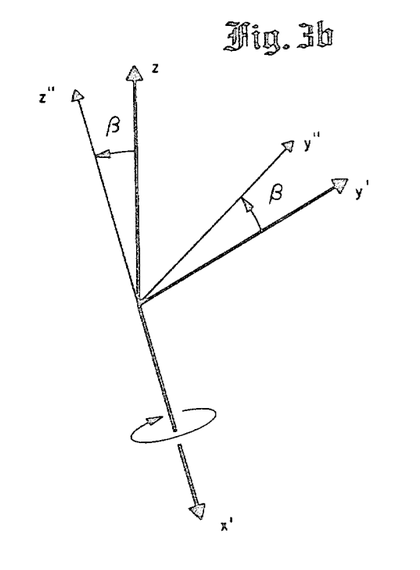
Figure 3C:
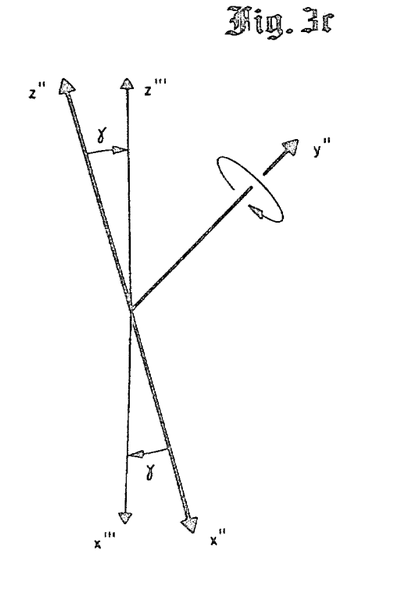

The x, y, z or pitch, roll and yaw axes of the vehicle do not, in general, coincide with the E-W, N-S and local vertical directions. To change measured signals in the vehicle coordinate system into components in a second set of coordinates, one may transform through a set of Euler angles. The Euler angle transformation is shown in FIGS. 3A, 3B and 3C. The first Euler angle rotation of coordinates, shown in FIG. 3A, is about the z axis through an angle α to define a first intermediate right handed set of orthogonal coordinates x', y' and z. The second Euler angle rotation of coordinates, shown in FIG. 3B, is about the x' axis through an angle β to define a second intermediate right handed set of orthogonal coordinates x', y'', z''. The third Euler angle rotation of coordinates, shown in FIG. 3C, is about the y'' axis through an angle γ to define the right handed set of orthogonal coordinates x''', y'', z''' which correspond to the directions, east, north and vertical.

The transformation between the x, y, z axes and the x''', y'', z''' axes is a matrix [P] made up of sines and cosines of α, β and γ.
Thus:

$$\begin{bmatrix} \hat{\omega}_x \\ \hat{\omega}_y \\ \hat{\omega}_z \end{bmatrix} = [P]^{-1} \begin{bmatrix} 0 \\ \Omega_H \\ \Omega \end{bmatrix} \tag{1}$$

Where $\hat{\omega}_x$, $\hat{\omega}_y$, $\hat{\omega}_z$ are signals which are measured by either rate sensor 10 or 12. $\Omega_H$ is the horizontal, north-directed, y''' component of the earth's rotation rate, and $\Omega_v$ is the locally vertical z''' component of the earth's rotation rate. Equation (1) may also be written:

$$\begin{bmatrix} 0 \\ \Omega_H \\ \Omega_V \end{bmatrix} = [P] \begin{bmatrix} \hat{\omega}_x \\ \hat{\omega}_y \\ \hat{\omega}_z \end{bmatrix} \tag{1A}$$

Similarly the measured accelerations $\hat{a}_x$, $\hat{a}_y$, $\hat{a}_z$ may be transformed from one coordinate system to the other.

$$\begin{bmatrix} a_{E-W} \\ a_{N-S} \\ a_V \end{bmatrix} = [P] \begin{bmatrix} \hat{a}_x \\ \hat{a}_y \\ \hat{a}_z \end{bmatrix} \tag{2}$$

It is convenient to express the accelerations in units of "g", the acceleration of gravity.

When the equations are transformed with the turntable 22 in its zero degree position and the supporting vehicle 30 at rest $$\hat{a}_{x0} = -\cos\beta \sin\gamma + B_x \tag{3}$$

$$\hat{a}_{y0} = \sin\beta + B_y \tag{4}$$

$$\hat{a}_{z0} = \cos\beta \cos\gamma + B_z \tag{5}$$

where $B_x$, $B_y$, $B_z$ are the bias errors of the accelerometer.

When the turntable is turned to its 180 degree position, and the vehicle 30 still at rest, $$\hat{a}_x 180 = \cos\beta \sin\gamma + B_x \tag{6}$$

$$\hat{a}_y 180 = -\sin\beta + B_y \tag{7}$$

$$\hat{a}_z 180 = \cos\beta \cos\gamma + B_z \tag{8}$$

Taking the differences of equations (3) and (6) and of equations (4) and (7), $$\hat{\Delta}a_x = -2 \cos\beta \sin\gamma \tag{9}$$

$$\hat{\Delta}a_y = 2 \sin\beta \tag{10}$$

Taking the sums of equations (3) and (6) and equations (4) and (7), $$\hat{\Sigma}a_x = 2 B_x \tag{11}$$

$$\hat{\Sigma}a_y = 2 B_y \tag{12}$$

One may then determine γ and β from equations (9) and (10), $$\tilde{\beta} = \sin^{-1}\left(\frac{\hat{\Delta} a_y}{2}\right) \tag{13}$$

$$\tilde{\gamma} = \sin^{-1}\left(\frac{\hat{\Delta} a_x}{-2\cos\beta}\right) \tag{14}$$

From equations (11) and (12), $\beta_x$ and $\beta_y$ may be determined $$\tilde{B}_x = \frac{\Sigma \hat{a}_x}{2} \tag{15}$$

$$\tilde{B}_y = \frac{\Sigma \hat{a}_y}{2} \tag{16}$$

From equations (5) or (8)

$$\tilde{B}_z = \hat{a}_{z0}(\text{or } \hat{a}_{z180}) - \cos\tilde{\beta}\cos\tilde{\gamma} \tag{17}$$

Where the $\sim$ symbol means an estimated signal.

With the turntable 22 in its zero degree position, the gyroscopes 10 and 12 measure, $$\hat{\omega}_{x10_0} = (\cos\alpha\,\sin\beta\,\sin\gamma + \sin\alpha\,\cos\gamma)\Omega_H \tag{18}$$
$$- (\cos\beta\,\sin\gamma)\Omega_V - M_{x10}\cos\beta\,\sin\gamma$$
$$+ Q_{x10}\cos\beta\,\cos\gamma - A_{x10}\sin\beta\,\cos\beta\,\sin\gamma$$
$$+ \epsilon_{x10}$$

$$\hat{\omega}_{y12_0} = (\cos\alpha\,\cos\beta)\Omega_H + (\sin\beta)\Omega_V + M_y\sin\beta \tag{19}$$
$$+ Q_{y12}\cos\beta\,\cos\gamma - A_{y12}\sin\beta\,\cos\beta\,\sin\gamma + \epsilon_{y12}$$

$$\hat{\omega}_{z10_0} = (\sin\alpha\,\sin\gamma - \cos\alpha\,\sin\beta\,\cos\gamma)\Omega_H \tag{20}$$
$$+ (\cos\beta\,\cos\gamma)\Omega_V + M_{z10}\cos\beta\,\cos\gamma$$
$$- Q_{z10}\cos\beta\,\sin\gamma + A_{z10}\sin\beta\,\cos\beta\,\cos\gamma$$
$$+ \epsilon_{z10}$$

$$\hat{\omega}_{z12_0} = (\sin\alpha\,\sin\gamma - \cos\alpha\,\sin\beta\,\cos\gamma)\Omega_H \tag{21}$$
$$+ (\cos\beta\,\cos\gamma)\Omega_V + M_{z12}\cos\beta\,\cos\gamma$$
$$+ Q_{z12}\sin\beta - A_{z12}\cos^2\beta\,\sin\beta\,\cos\gamma$$
$$+ \epsilon_{z12}$$

Where M is a mass unbalance drift coefficient for mass unbalance of the designated gyroscope 10 or 12 in the direction of the designated axis A is the anisoelastic drift coefficient due to the anisoelasticity of the designated gyroscope 10 or 12 about the designated axis;

Q is the quadrature drift coefficient which occurs only in a dry tuned rotor gyroscope due to mass unbalance coupling into the quadrature axis;

$\epsilon$ is the non-acceleration sensitive drift error in the gyroscope about the designated axis.

With the turntable 22 in its 180 degree position, $$\hat{\omega}_{x10_{180}} = -(\cos\alpha\,\sin\beta\,\sin\gamma + \sin\alpha\,\cos\gamma)\Omega_H \tag{22}$$
$$+ (\cos\beta\,\sin\gamma)\Omega_V + M_{x10}\cos\beta\,\sin\gamma$$
$$+ Q_{x10}\cos\beta\,\cos\gamma - A_{x10}\sin\beta\,\cos\beta\,\sin\gamma$$
$$+ \epsilon_x$$

$$\hat{\omega}_{y12_{180}} = -(\cos\alpha\,\cos\beta)\Omega_H - (\sin\beta)\Omega_V - M_{y12}\sin\beta \tag{23}$$
$$+ Q_{y12}\cos\beta\,\cos\gamma - A_{y12}\sin\beta\,\cos\beta\,\sin\gamma$$
$$+ \epsilon_{y12}$$

$$\hat{\omega}_{z10_{180}} = (\sin\alpha\,\sin\gamma - \cos\alpha\,\sin\beta\,\cos\gamma)\Omega_H \tag{24}$$
$$+ (\cos\beta\,\cos\gamma)\Omega_V + M_{z10}\cos\beta\,\cos\gamma$$
$$+ Q_{z10}\cos\beta\,\sin\gamma - A_{z10}\sin\beta\,\cos\beta$$
$$+ \epsilon_{z10}$$

$$\hat{\omega}_{z12_{180}} = (\sin\alpha\,\sin\gamma - \cos\alpha\,\sin\beta\,\cos\gamma)\Omega_H \tag{25}$$
$$+ (\cos\beta\,\cos\gamma)\omega_V + M_{z12}\cos\beta\,\cos\gamma$$
$$- Q_{z12}\sin\beta + A_{z12}\cos^2\beta\,\sin\gamma\,\cos\gamma$$
$$+ \epsilon_{z12}$$

Taking the differences and sums of equations (18) and (22) and equations (19) and (23), $$\Delta\hat{\omega}_{xn} = 2(\cos\alpha\,\sin\beta\,\sin\gamma + \sin\alpha\,\cos\gamma)\Omega_H \tag{26}$$
$$- 2(\cos\beta\,\sin\gamma)\Omega_V - 2M_{x10}\cos\beta\,\sin\gamma$$

$$\Sigma\,\hat{\omega}_{x10} = 2Q_{x10}\cos\beta\,\cos\gamma - 2A_{x10}\sin\beta\,\cos\beta\,\sin\alpha \tag{27}$$
$$+ 2\epsilon_{x10}$$

$$\Delta\hat{\omega}_{y12} = 2(\cos\alpha\,\cos\beta)\Omega_H + 2(\sin\beta)\Omega_V \tag{28}$$
$$+ 2M_{y12}\sin\beta$$

$$\Sigma\,\hat{\omega}_{y12} = 2Q_{y12}\cos\beta\,\cos\gamma - 2A_{y12}\sin\beta\,\cos\beta\,\sin\gamma \tag{29}$$
$$+ 2\epsilon_{y12}$$

Combining equations (26) and (28)

$$\tilde{\alpha} = \tan^{-1}\left\{\frac{\cos\tilde{\beta}}{\cos\tilde{\gamma}}\left[-\tan\tilde{\beta}\,\sin\tilde{\gamma} + \frac{\frac{\Delta\hat{\omega}_{x10}}{2} + \cos\tilde{\beta}\,\sin\tilde{\gamma}(\Omega_V + M_{x10})}{\frac{\Delta\omega_{y12}}{2} - \sin\tilde{\beta}(\Omega_V + M_{y12})}\right]\right\} \tag{30}$$

It should be noted that the gyroscope drift coefficients Q and A do not appear in equation (30) because they have cancelled in the difference equations (26) and (28). Also note that $M_{x10}$ and $M_{y12}$ are for different gyroscopes, and errors in knowledge of the values are expected to be uncorrelated so that their effects on the estimate of $\alpha$ is in a Root Sum Squared sense rather than a direct sense.

The drift parameters of the gyroscopes may be estimated from equations (27) and (29).

Take the sum of equations (20) and (24) and of equations (21) and (25).

$$\Sigma\,\hat{\omega}_{z10} = 2(\sin\alpha\,\sin\gamma - \cos\alpha\,\sin\beta\,\cos\gamma)\Omega_H \tag{31}$$
$$+ 2(\cos\beta\,\cos\gamma)\Omega_V + 2M_{z10}\cos\beta\,\cos\gamma$$
$$+ 2\epsilon_{z10}$$

-continued $$\Sigma \hat{\omega}_{z12} = 2 (\text{Sin}\alpha \text{ Sin}\gamma - \text{Cos}\alpha \text{ Sin}\beta \text{ Cos}\gamma)\Omega_H \qquad (32)$$
$$+ 2 (\text{Cos}\beta \text{ Cos}\gamma)\Omega_v + 2 M_{z12} \text{Cos}\beta \text{ Cos}\gamma$$
$$+ 2\epsilon_{z12}$$

From which estimates of the drift terms can be made.

$$(\epsilon_{z10} + \widetilde{M_{z10} \text{Cos}\beta} \text{ Cos}\gamma) = \qquad (33)$$
$$\frac{\Sigma \hat{\omega}_{z10}}{2} - (\text{Sin}\tilde{\alpha}\text{Sin}\tilde{\gamma} - \text{Cos}\tilde{\alpha}\text{Sin}\tilde{\beta}\text{Cos}\tilde{\gamma})\Omega_H - (\text{Cos}\tilde{\beta} \text{ Cos}\tilde{\gamma})\Omega_v$$

$$(\epsilon_{z12} + \widetilde{M_{z12} \text{Cos}\beta} \text{ Cos}\gamma) = \qquad (34)$$
$$\frac{\Sigma \hat{\omega}_{z12}}{2} - (\text{Sin}\tilde{\alpha}\text{Sin}\tilde{\gamma} - \text{Cos}\tilde{\alpha}\text{Sin}\tilde{\beta}\text{Cos}\tilde{\gamma})\Omega_H - (\text{Cos}\tilde{\beta} \text{ Cos}\tilde{\gamma})\Omega_v$$

Since the instruments are rotated through a known angle of 180 degrees about the z axis, the scale factor for $\omega_{z10}$ and $\omega_{z12}$ may be estimated.

$$\int_0^{\Delta T} K_{z10} \hat{\omega}_{z10} dt = TT \qquad (35)$$

where $$\hat{\omega}_{z10} = \omega_{z10}(t)$$

due to earth rate $+\Omega_{TT}(t)$ and $\Omega_{TT}(t)$ is the rate of rotation of the turntable 22 about the z axis during rotation from zero to 180 degrees.

Note that the preferred orientation also provides two sources of "azimuth" body rate ($\tilde{\alpha}$) measurements about the z axis, thereby permitting averaging or optimally mixing or even selecting to improve performance. This is important because the azimuth angle ($\alpha$) is not readily bounded as the pitch and roll angles may be by use of the x and y accelerometers 16 and 18.

Alignment with the alternate gyroscope orientation of FIG. 2A is now considered.

The acceleration measurements are the same as in equations (3) through (8), and the difference and sum of equations (9) through (12) are the same. Equations (13) through (17) are also the same.

For the zero degree position of the turntable 22, $$\hat{\omega}_{x12_0} = (\text{Cos}\alpha \text{ Sin}\beta \text{ Sin}\gamma + \text{Sin}\alpha \text{ Cos}\gamma)\Omega_H \qquad (40)$$
$$- (\text{Cos}\beta \text{ Sin}\gamma)\Omega_v - M_{x12} \text{Cos}\beta \text{ Sin}\gamma$$
$$+ Q_{x12} \text{Sin}\beta + A_{x12} \text{Sin}\beta \text{ Cos}\beta \text{ Cos}\gamma + \epsilon_{x12}$$

$$\hat{\omega}_{y12_0} = (\text{Cos}\alpha\text{Cos}\beta)\Omega_H + (\text{Sin}\beta)\Omega_v + M_{y12} \text{Sin}\beta \qquad (41)$$
$$- Q_{y12} \text{Cos}\beta \text{ Sin}\gamma - A_{y12} \text{Cos}^2\beta \text{ Sin}\gamma \text{ Cos}\gamma + \epsilon_{y12}$$

The equations for $$\hat{\omega}_{x10_0} \text{ and } \hat{\omega}_{z10_0}$$

are the same as equations (18) and (20), respectively.

When the turntable 22 is turned to the 180 degree position, $$\hat{\omega}_{x12_{180}} = -(\text{Cos}\alpha \text{ Sin}\beta \text{ Sin}\gamma + \text{Sin}\alpha \text{ Cos}\gamma)\Omega_H \qquad (42)$$
$$+ (\text{Cos}\beta \text{ Sin }\gamma)\Omega_v + M_{x12} \text{Cos}\beta \text{ Sin}\gamma$$
$$- Q_{x12} \text{Sin}\beta - A_{x12} \text{Sin}\beta \text{ Cos}\beta \text{ Cos}\gamma + \epsilon_{x12}$$

$$\hat{\omega}_{y12_{180}} = -(\text{Cos}\alpha \text{ Cos}\beta)\Omega_H - (\text{Sin}\beta)\Omega_v - M_{y12} \text{Sin}\beta \qquad (43)$$
$$+ Q_{y12} \text{Cos}\beta \text{ Sin}\gamma + A_{y12} \text{Cos}^2\beta \text{ Sin}\gamma \text{ Cos}\gamma$$
$$+ \epsilon_{y12}$$

The equations for $$\hat{\omega}_{x10_{180}} \text{ and } \hat{\omega}_{z10_{180}}$$

are the same as equations (22) and (24), respectively.

Forming the sum and difference equations from equations (40) and (42) and equations (41) and (43).

$$\Delta\hat{\omega}_{x12} = 2 (\text{Cos}\alpha \text{ Sin}\beta \text{ Sin}\gamma + \text{Sin}\alpha \text{ Cos}\gamma)\Omega_H \qquad (44)$$
$$- 2 (\text{Sin}\beta \text{ Sin}\gamma)\Omega_v - 2 M_{x12} \text{Cos}\beta \text{ Sin}\gamma$$
$$+ 2 Q_{x12} \text{Sin}\beta + 2 A_{x12} \text{Sin}\beta \text{ Cos}\beta \text{ Cos}\gamma$$
$$\Sigma\omega_{x12} = 2\epsilon_{x12} \qquad (45)$$

$$\Delta\hat{\omega}_{y12} = 2 (\text{Cos}\alpha \text{ Cos}\beta)\Omega_H + 2 (\text{Sin}\beta)\Omega_V \qquad (46)$$
$$+ 2 M_{y12} \text{Sin}\beta - 2 Q_{y12} \text{Cos}\beta \text{ Sin}\gamma$$
$$- 2 A_{y12} \text{Cos}\beta \text{ Sin}\gamma \text{ Cos}\gamma$$
$$\Sigma\hat{\omega}_{y12} = 2 \epsilon_{y12} \qquad (47)$$

Using equations (44) and (46), an estimate of azimuth angle ($\alpha$) about the z axis is made:

$$\tilde{\alpha} = \text{Tan}^{-1}\left\{\frac{\text{Cos }\tilde{\beta}}{\text{Cos }\tilde{\gamma}}\left[-\text{Tan }\tilde{\beta} \text{ Sin }\tilde{\gamma} + \frac{\frac{\Delta\hat{\omega}_{x12}}{2} + \text{Cos}\tilde{\beta} \text{ Sin}\tilde{\gamma}(\Omega_v + M_{x12}) - Q_{x12} \text{Sin}\tilde{\beta} - A_{x12} \text{Sin}\tilde{\beta} \text{ Cos}\tilde{\beta} \text{ Cos}\tilde{\gamma}}{\frac{\Delta\hat{\omega}_{y12}}{2} - \text{Sin}\tilde{\beta}(\Omega_v + M_{y12}) + Q_{y12} \text{Cos}\tilde{\beta} \text{ Sin}\tilde{\gamma} + A_{y12} \text{Cos}^2\tilde{\beta} \text{ Sin}\tilde{\beta} \text{ Cos}\tilde{\gamma}}\right]\right\} \qquad (48)$$

Similarly gyroscope bias drift estimates may be made from equations (45) and (47)

$$\tilde{\epsilon}_{x12} = \frac{\Sigma\hat{\omega}_{x12}}{2} \qquad (49)$$

$$\tilde{\epsilon}_{y12} = \frac{\Sigma\hat{\omega}_{y12}}{2} \qquad (50)$$

Equation (33) is also valid for this mechanization.
An estimate for $$K_{z12}$$

can also be made as in equation (39).

Note from equation (48) that this second configuration produces error terms which could become important during alignment when pitch and roll angles, $\beta$ and $\gamma$ become significant (for example, greater than six degrees). Also note that only one gyroscope 10 measures $\alpha$, but two gyroscopes 10 and 12 measure $\beta$. Hence in this embodiment errors in $\alpha$ cannot be reduced by combining or selecting, but errors in $\beta$ can be reduced by combining. However, this redundancy feature is not important in $\beta$ because the accelerometers can produce an independent measure of $\beta$.

The above equations and description implement the alignment of the apparatus of this invention.

It is likely, in a preferred embodiment of the invention, that a general purpose digital computer or processor would be used to receive the output signals of the gyroscopes and the accelerometer. Those output signals would either be in digital form or be converted to digital form. The computer would then produce output signals, probably in digital form.

For purposes of explanation the computer functions have been shown in FIGS. 4–15 in block form. One may consider the blocks to be portions of a general purpose computer, software for a computer, or an analog computer.

Figure 4:
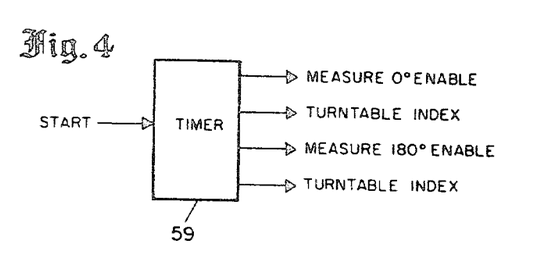
FIG. 4 is a block diagram of a timer used in this invention during alignment.
Figure 5:
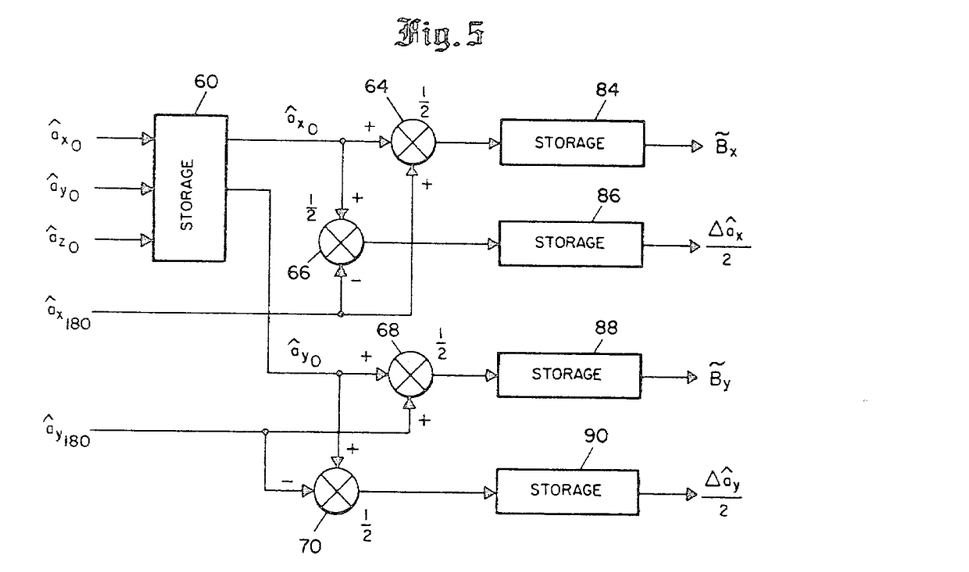
FIG. 5 is a block diagram of means for producing initial bias signals and acceleration signals for the x and y accelerometers.

FIG. 4 shows a timer 59 which may be started with a start signal or energized from a switch. Initially, the timer should enable the turntable motor to place the turntable 22 in its zero degree position and enable the computers of FIGS. 5 and 9 to store the output signals of the gyros and accelerometers in the storage memories 60, 62. The timer 59 then sends a signal to the turntable motor to index the turntable 22 into its 180 degree position. The timer 59 then enables the storage memories 60, 62 to deliver their stored signals to the various summers 64, 66, 68, 70, 72, 74, 76, 78, 80, 82 for adding or subtracting the outputs of the sensors on the gyroscopes 10, 12 and the accelerometers 16, 18, 20. The sum and difference signals of FIG. 5 are then stored in storage memories 84, 86, 88, 90 for future use. The outputs of summers 72, 74, 76, 78, 80, 82, if desired, also may be entered into storage (not shown).

Figure 6:
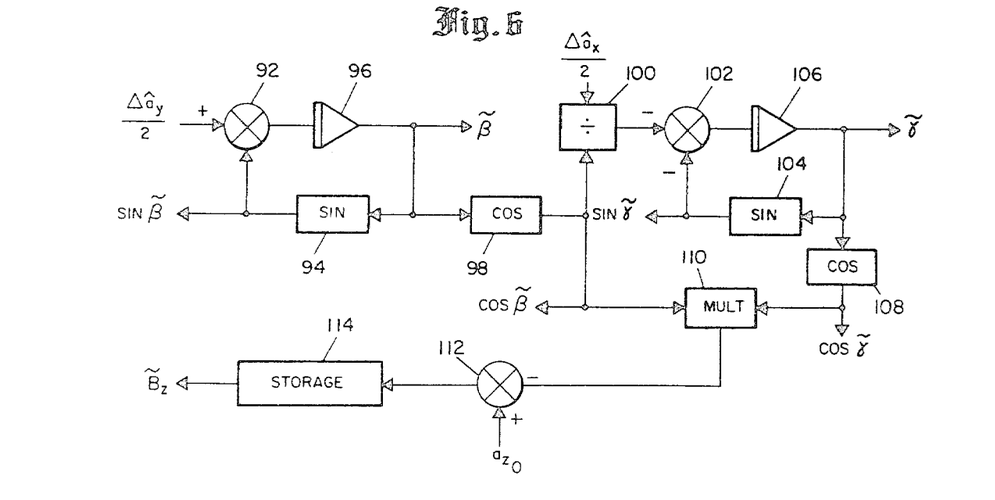
FIG. 6 is a block diagram of means for producing initial $\beta$ and $\gamma$ signals.

Equations (13) and (17) are mechanized in FIG. 6

The $\Delta \hat{a}_y/2$ input is obtained from FIG. 5.

The $\hat{a}_{zo}$ is obtained from the memory 60 of FIG. 5. The $\tilde{\beta}$ signal is delivered by an adder 92 receiving $\Delta \hat{a}_y/2$ signals from memory 90 and sin $\tilde{\beta}$ signals from sin generator 94. The output of the adder 92 is then integrated by integrator 96 to produce the $\tilde{\beta}$ signal. Sin $\tilde{\beta}$ and cos $\tilde{\beta}$ signals are then produced by sin generator 94 and cos generator 98.

$\Delta \hat{a}_x/2$ is divided by cos $\tilde{\beta}$ through a divider 100, and the resultant signal is delivered to an adder 102. The adder 102 also receives input from sin generator 104. The output of adder 102 is integrated by integrator 106 to produce an output signal $\tilde{\gamma}$. The $\tilde{\gamma}$ signal is delivered to sin generator 104 and cos generator 108 to produce sin $\tilde{\gamma}$ and cos $\tilde{\gamma}$ signals.

Cos generators 98 and 108 are connected to multiplier 110 with adder signal 112. The output signal $B_z$ is stored by memory 114.

Figure 7:
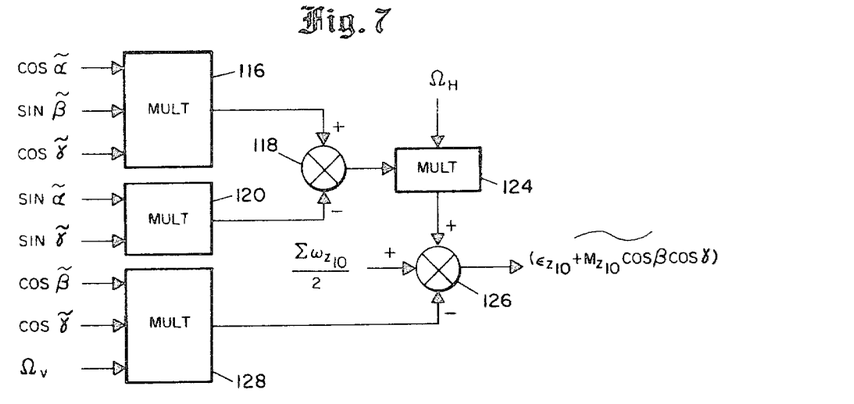
FIG. 7 is a block diagram of means for producing an initial gyroscope biasing signal for one gyroscope.
Figure 10:
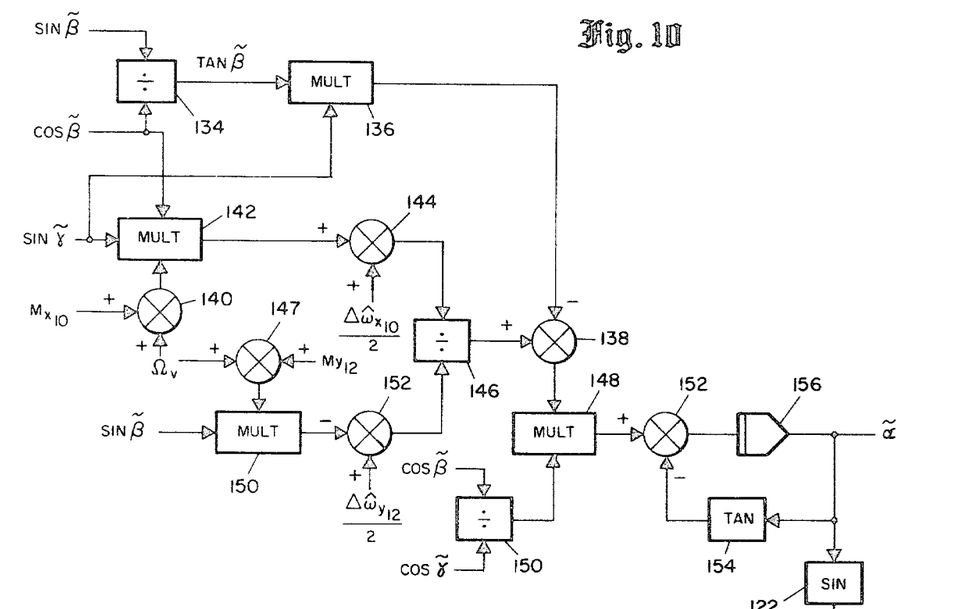
FIG. 10 is a means for producing a signal of the value of $\alpha$ during alignment.

In FIG. 7 the cos $\tilde{\alpha}$, sin $\tilde{\beta}$ and cos $\tilde{\gamma}$ outputs of FIGS. 6 and 10 are connected into multiplier 116 whose output is connected into adder 118. The sin $\tilde{\alpha}$ input to multiplier 120 is obtained from sin generator 122 of FIG. 10.

The sin $\tilde{\gamma}$ input to multiplier 120 is from sin generator 104 of FIG. 6. The output of multiplier 120 is subtracted in summer 118.

For a given latitude, known a priori, at the position of alignment, one can generate a signal proportional to the horizontal component of earth's rotation at that latitude. The signal is then delivered to multiplier 124 where it is multiplied by the output of adder 118. The adder 126 receives the output of multiplier 124, the output of multiplier 128 and the output of adder 80 of FIG. 9 to mechanize equation 33. The cos $\tilde{\beta}$ and cos $\tilde{\gamma}$ inputs to multiplier 128 are obtained from FIG. 6. The $\Omega_v$ input to multiplier 128 is the calculated vertical component of earth's rotation for the particular known latitude where the alignment occurs.

Equation 34 may be mechanized the same as equation 33.

Figures 8, 9:
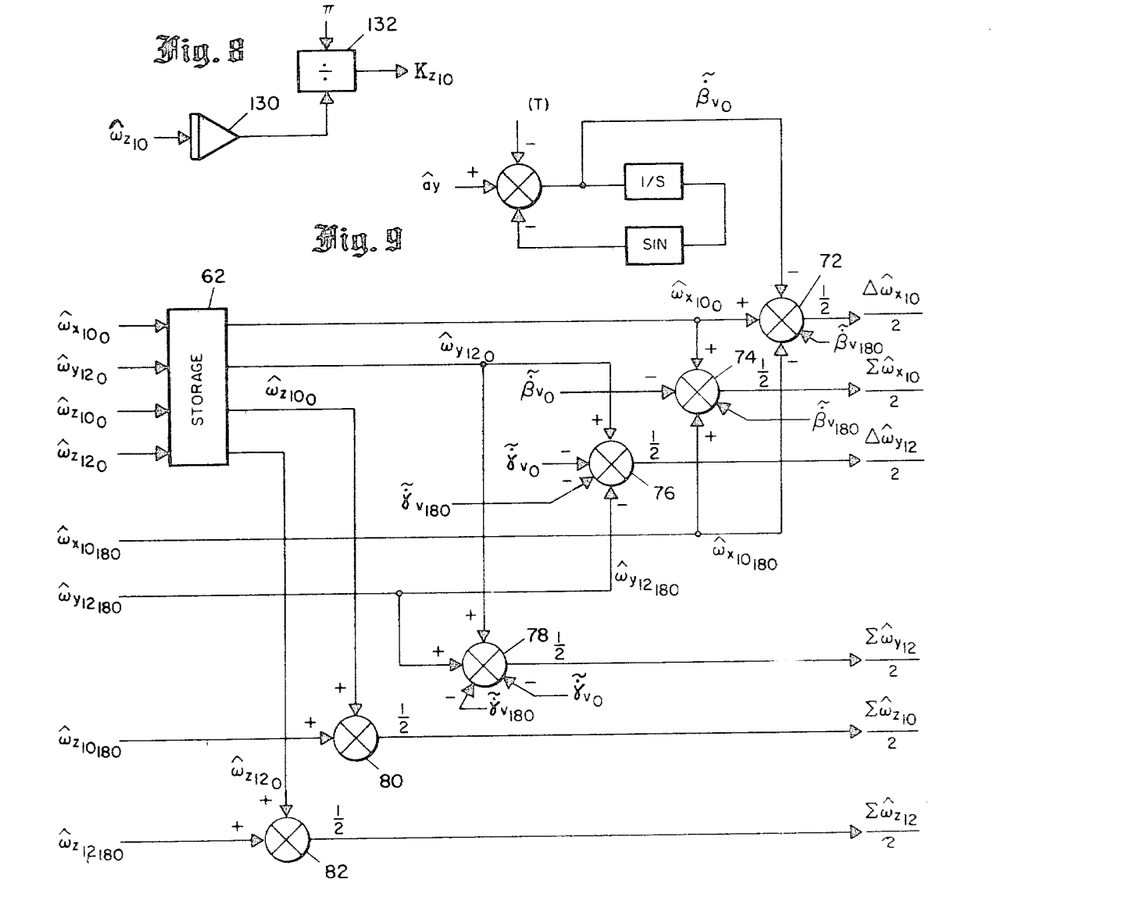
FIG. 8 is a means for producing a scale factor signal for the z axis sensor on one of the gyroscopes.
FIG. 9 is a means for producing sum and difference signals for the two gyroscopes in different turntable positions during alignment.

FIG. 8 mechanizes equation (38), and equation (39) may be mechanized in a similar fashion. The output of adder 80 of FIG. 9 is delivered to an adder 130. A signal which is a measure of the known angular velocity of turntable 22 is added into adder 130. The output of adder 130 is divided into $\pi$ by the divider 132 to produce a $K_{z10}$ signal.

FIG. 10 mechanizes equation 30. The sin $\tilde{\beta}$, cos $\tilde{\beta}$, sin $\tilde{\gamma}$, cos $\tilde{\gamma}$ inputs are from FIG. 6. The $\Omega_v$ input is known from knowledge of the local latitude at the initial calibration position.

The $M_{x10}$, $M_{y12}$, inputs are known constants of the gyroscopes.

The $\Delta \hat{\omega}_{y12}/2$ and the $\Delta \hat{\omega}_{x10}/2$ inputs are from FIG. 9. The sin $\tilde{\beta}$, cos $\tilde{\beta}$ terms are delivered to divider 134 to produce a tan $\tilde{\beta}$ signal. The tan $\tilde{\beta}$ signal is multiplied in multiplier 136 by the sin $\alpha$ signal. The output of multiplier 136 is delivered to adder 138.

The $M_{x10}$ and $\Omega_v$ signals are added in adder 140 and the sum signal is delivered to multiplier 142 where it is multiplied by cos $\tilde{\beta}$ and sin $\tilde{\gamma}$. The output of multiplier 142 is added in adder 144 to $\Delta \hat{\omega}_{x10}/2$.

The output of adder 144 is delivered to divider 146.
The $M_{y12}$ and $\Omega_v$ signals are added in adder 147 and the sum signal is delivered to multiplier 150 where it is multiplied by sin $\tilde{\beta}$. The output of multiplier 150 is added, in adder 152, to $\Delta \hat{\omega}_{y12}/2$, and the sum signal is delivered to divider 146. The output of divider 146 is delivered to adder 138 to multiplier 148. A cos $\tilde{\beta}$ over cos $\tilde{\gamma}$ signal is produced in divider 150. The signal from 150 is delivered to multiplier 148, and the output of multiplier 148 is delivered to adder 152.

A tan $\bar{\alpha}$ signal is delivered by tan generator 154 to adder 152. The output of adder 152 is integrated by integrator 156 to produce an $\bar{\alpha}$ signal. Tan $\bar{\alpha}$ and sin $\bar{\alpha}$ signals are produced by tan generator 154 and Sin generator 122, respectively.

FIGS. 11-15 are mechanizations of the heading reference of this invention in its operative mode.

Figure 11:
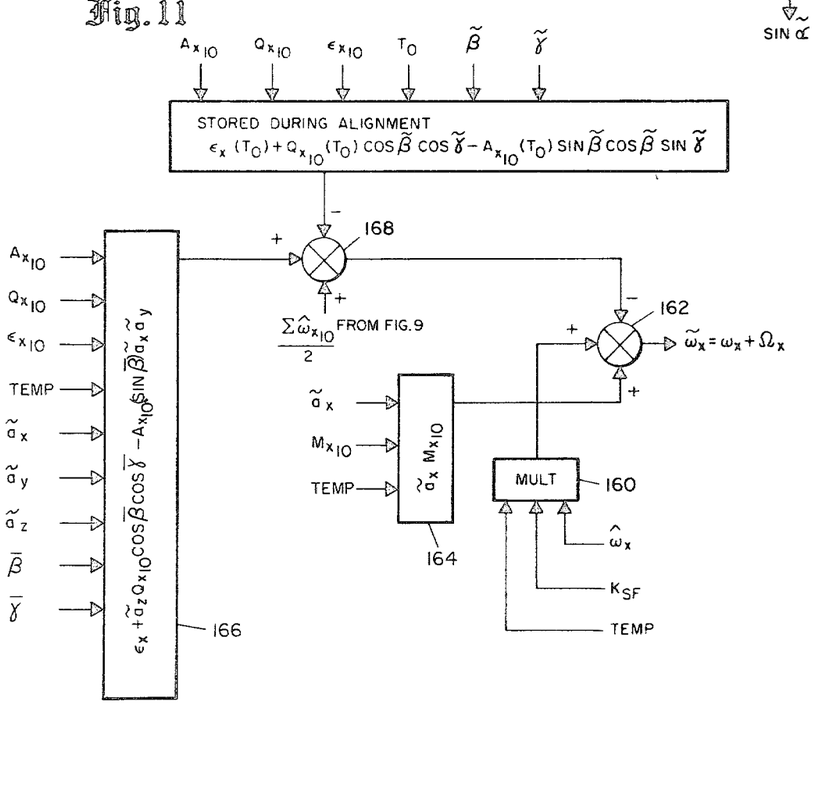
FIG. 11 is a means for producing a compensated signal of the angular rate signal about the x or y axis.

FIG. 11 shows a typical computer which continuously removes various $\epsilon$, Q, A and M bias errors from the output signals of the gyroscopes. $\hat{\omega}_x$ is an output from a gyroscope 10 sensor.

The $K_{sF}$ is a computer scale factor which is known. The temperature sensor 50 adjacent to the gyroscopes and accelerometers produces a temperature signal which modifies the scale factor in a known way. These signals are delivered to multiplier 160, and the produced signal is delivered to adder 162.

A temperature sensitive correction factor is delivered from multiplier 164 to adder 162. The $\bar{a}_x$ is delivered from a circuit substantially identical to FIG. 12 but with $a_x$ and $\bar{B}_x$ inputs. $M_x$ is known, and the temperature signal comes from sensor 50.

The multiplier 166 receives known signals $A_{x10}$, $Q_{x10}$, $\epsilon_{x10}$, which are known constants of gyroscope 10. The $\bar{a}_x$ and $\bar{a}_y$ signals come from circuits like FIG. 12. The $\bar{\beta}$ and $\bar{\gamma}$ signals are updated pitch and roll angle signals from FIG. 14. Multiplier 166 has a multiplying factor which is temperature sensitive in a known function of temperature.

The initial bias corrections of equation (27) during alignment, from FIG. 9, are added in adder 168 from the updated signal output of multiplier 166. Storage means (not shown) may be needed to hold the signal of FIG. 9.

The output of adder 168 is subtracted in adder 162 to produce $\tilde{\omega}_x$ signal which is the sum of the component of earth rate about the x axis and the relative angular rate about the x axis.

A circuit similar to that of FIG. 11 also may be used to calculate $\tilde{\Omega}_y$ and $\tilde{\Omega}_z$.

Figures 12, 13:
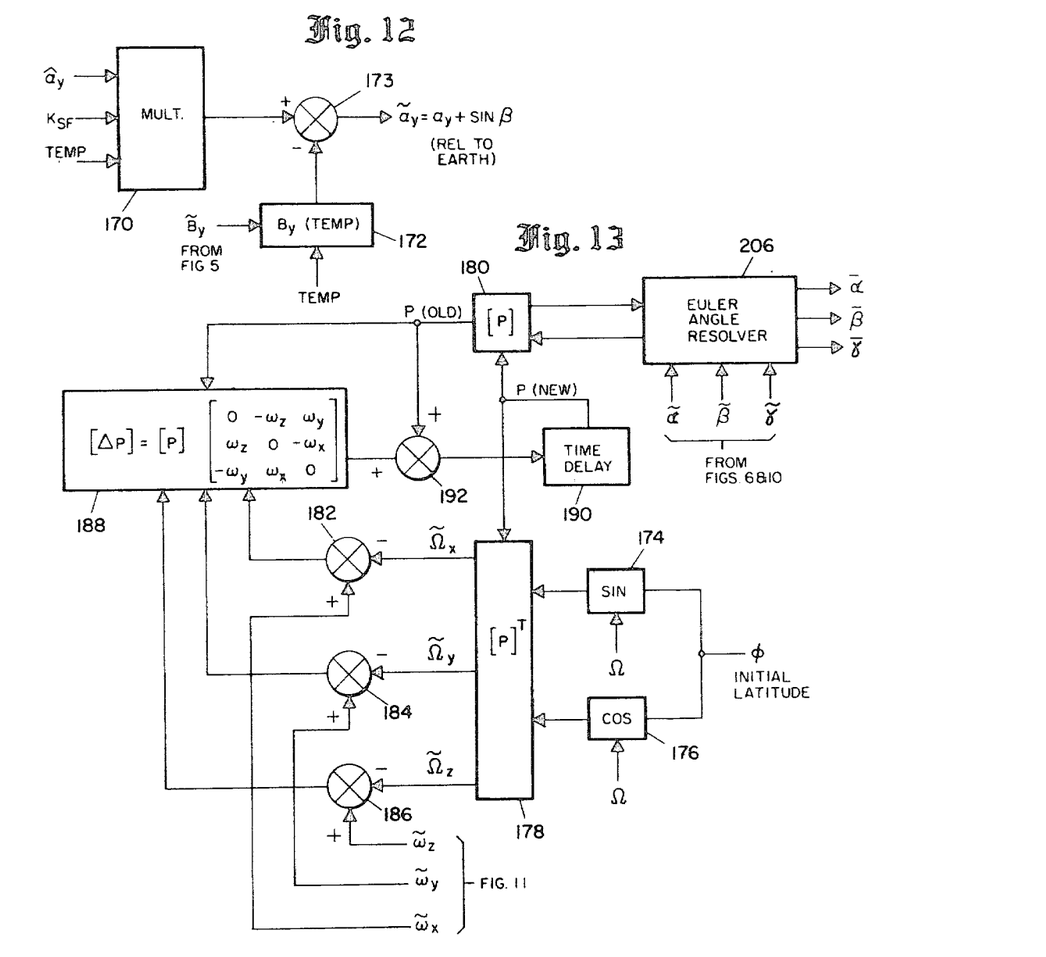
FIG. 12 is a means for producing a compensated signal of the acceleration of the vehicle along its x or y axis.
FIG. 13 is a means for producing updated signals for interchanging signals between vehicle oriented coordinates and earth-fixed coordinates.

There is a circuit like FIG. 12 for each x, y accelerometer channel. The accelerometer signal is delivered to a temperature sensitive multiplier 170. The scale factor $K_{sF}$ is known, and temperature signals are received from sensor 50. Bias signals such as $\bar{B}_y$ are delivered from FIG. 5 to a temperature sensitive multiplier which receives temperature signals from sensor 50. The outputs of multipliers 170, 172 are added in adder 173 to produce an $\bar{a}_y$ signal which has a component due to gravity unless $\beta=0$, plus a true acceleration signal.

Figure 14:
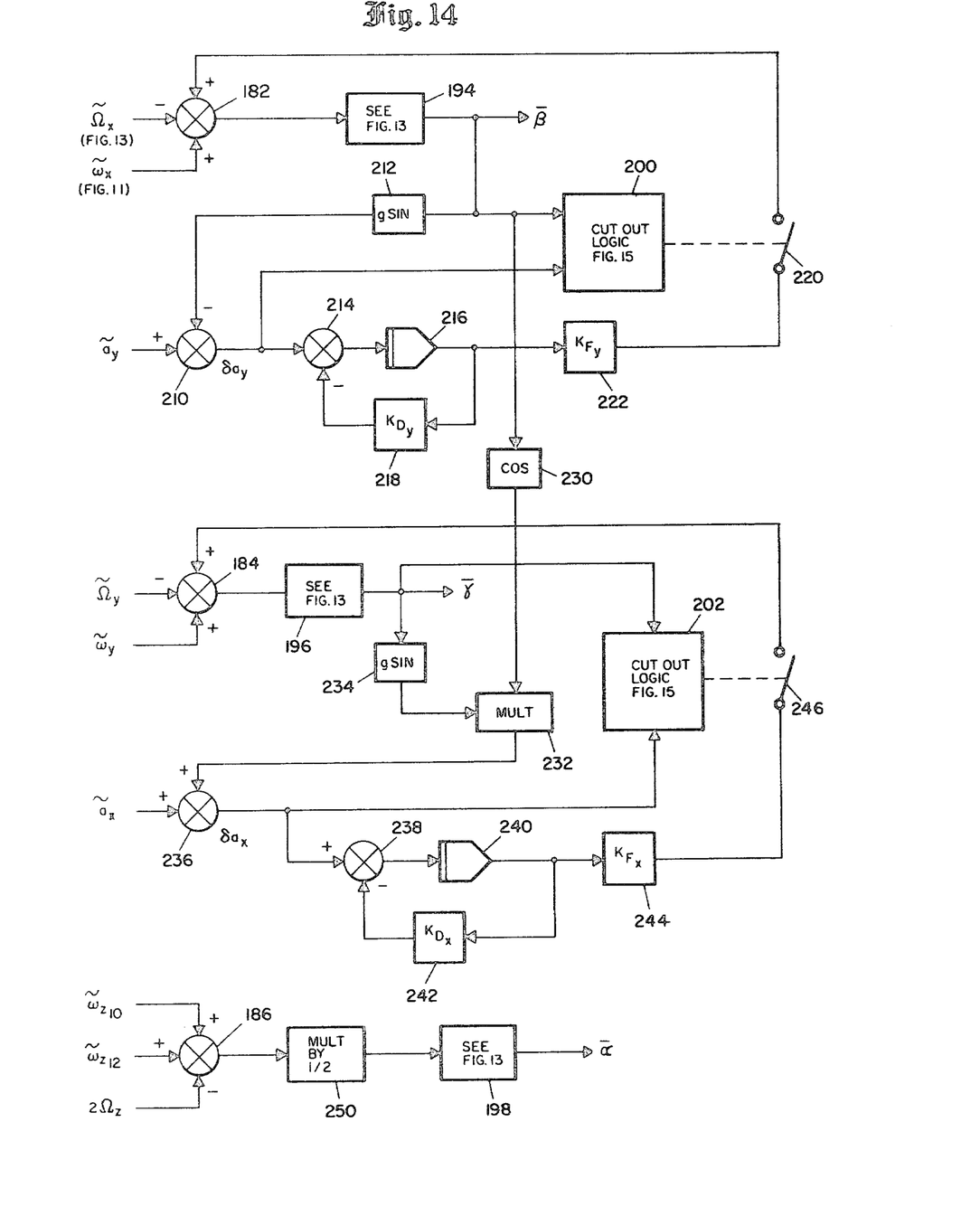
FIG. 14 is a mechanization for producing compensated $\alpha$, $\beta$ and $\gamma$ signals using the apparatus of FIG. 13.
Figure 15:
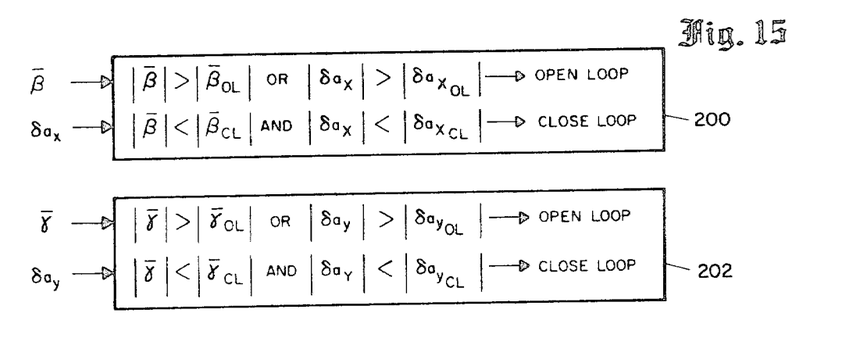
FIG. 15 is a block diagram of the cut-out logic of FIG. 14.

FIGS. 13 and 15 are portions of FIG. 14.

In FIG. 13, the known latitude signal (which may be obtained by any technique) is delivered to sin and cosine generators 174 and 176. An $\Omega$ signal proportional to earth rotation is also delivered to generators 174, 176. The $\Omega$ sin $\phi$ and $\Omega$ cos $\phi$ outputs of generator 174, 176 are delivered to sin, cos matrix mechanization 178. The mechanization 178 mechanizes three equations having sines and cosines therein and represented by a matrix $[P]^T$. The matrix $[P]^T$ terms are delivered from time delay block 190. The outputs of mechanization 178 are $\tilde{\Omega}_x$, $\tilde{\Omega}_y$ and $\tilde{\Omega}_z$ signals, the components of earth's rotation about axes x, y, z. The outputs of 178 are delivered to adders 182, 184, 186 where they are subtracted out of the sensed signals $\tilde{\Omega}_x$, $\tilde{\Omega}_y$, $\tilde{\Omega}_z$ from FIG. 11. The corrected signals are delivered to the matrix updating mechanism 188 which updates the information in matrix mechanization blocks 178 and 180. The block 180 mechanizes matrix equation [P] and block 178 mechanizes $[P]^T$.

The up-dating block 188 receives [P] signals from block 190 and performs matrix multiplication as indicated in block 188 to produce an updating increment for each term of [P] and $[P]^T$. The incremental output of block 188 is added to [P] in adder 192. The output of adder 192 is time delayed by 190, and the updated matrix terms are delivered to blocks 178, 180 and 188.

Blocks 194, 196, 198 of FIG. 14 together form FIG. 13. The adders 182, 184, 186 correspond to the same adders in FIG. 13, and the outputs $\bar{\alpha}$, $\bar{\beta}$, $\bar{\gamma}$ from the Euler angle resolver 206 of FIG. 13 correspond to the same outputs in FIG. 14.

Additional feedback circuitry to adders 182, 184 to stabilize the mechanization is shown in FIG. 14. The feedback loops, in turn may be cut out in accordance with logic built into blocks 200, 202. That logic is shown in FIG. 15.

In FIG. 14 the $\bar{\beta}$ signal is delivered to the cut out logic 200, and the $\bar{\gamma}$ signal is delivered to logic 202.

Signal $\bar{a}_y$ has subtracted therefrom in adder 210 a gravity component g sin B from sin generator 212 which, in turn, receives a $\bar{\beta}$ signal from block 194. The output of adder 210 is delivered to logic 200 and to adder 214. The output of adder 214 is integrated by integrator 216 and a part of the output signal is fed back through scaler 218 to adder 214. The output of integrator 216 is further scaled by scaler 222 and fed back through cutout switch 220 to adder 182.

The $\bar{\beta}$ output of 194 is delivered through a cos generator 230 to a multiplier 232. The $\bar{\gamma}$ output of block 196 is delivered through (g times) sin generator 234 to the multiplier 232. The output of multiplier 232 is a gravity term which is subtracted in adder 236 from the signal $\bar{a}_x$. The output of adder 236, labeled $\delta a_x$, is delivered to cut out logic 202 and to adder 238. The output of adder 238 is integrated by integrator 240, and the output is scaled by scaler 242 and fed back to adder 238.

The output of integrator 240 is also scaled by scaler 244 to deliver a scaled feedback signal through cut out switch 246 to adder 184.

The $\Omega_{z10}$ and $\Omega_{z12}$ outputs are added by adder 186 to $2\Omega_z$, and the output is multiplied by $\frac{1}{2}$ in multiplier 250 to produce an averaged signal which is delivered to block 198, which is part of FIG. 13, to produce an $\bar{\alpha}$ signal.

The cut out logic is shown in FIG. 15. The symbols $\bar{\beta}_{OL}$, $\delta a_{xOL}$, $\gamma_{OL}$ and $\delta a_{yOL}$ are predetermined thresholds at which the various loops open.

The symbols $\beta_{CL}$, $\delta a_{xCL}$, $\gamma_{CL}$ and $\delta a_{yCL}$ are thresholds at which the loops re-close, and they are slightly lower than the corresponding open loop thresholds to prevent relay chattering.

In summary the apparatus of this invention is a heading and attitude reference unit which uses strapped down gyroscopes and accelerometers together with accelerometers to generate accurate vehicle attitude and heading as well as vehicle angular rates.

It should also be noted that the particular errors due to M, Q, A and $\epsilon$ are peculiar to dry tuned flexure suspended rotor gyroscopes. Other kinds of gyroscopes as well as other angular rate sensors could be used. For example, nuclear magnetic resonance gyroscopes and laser gyroscopes could be used. Other kinds of gyroscopes and rate sensors would, of course, have their own error sources and those error sources could be identified by the initial sensing with the turntable first in one position then turned 180 degrees.

Although the invention has been described in detail above, it is intended that the invention shall not be limited by that description alone but in combination with the appended claims.

I claim:

1. A heading and attitude reference system for use in a vehicle having pitch, roll and yaw axes designated x, y and z, respectively, comprising:
    a turntable mounted for rotation about the z axis of said vehicle including means for positioning said turntable in a predetermined zero degree position and means for turning said turntable from said zero position into its 180 degree position;
    at least two angular rate sensors mounted on said turntable with their sensing axes parallel to x, y and z;
    at least two accelerometers mounted on said turntable with their sensing axes parallel to x and y;
    means for initially storing signals from said rate sensors and accelerometers when said vehicle is substantially stationary and said turntable is in its zero position;
    means for controlling the turning of said turntable from its zero degree into its 180 degree position;
    means for combining signals from said rate sensors and accelerometers when said turntable is in its 180 degree position with said stored signals to produce sum and difference signals; and
    means for combining said sum and difference signals to produce accelerometer and rate sensor initial bias signals, rate sensor scale factor signals, and signals indicative of the initial attitude angles between said x, y and z axes and a reference set of coordinates.

2. Apparatus as recited in claim 1 in which said means for combining said sum and difference signals comprises:
    means for producing a signal which is a measure of the initial pitch angle in response to the said difference signal of the said y axis accelerometer;
    means for producing a signal which is a measure of the initial roll angle in response to said pitch angle signal and said difference signal of said x axis accelerometer;
    means for producing a signal which is a measure of x axis accelerometer bias in response to said sum signal of said x axis accelerometer;
    means for producing a signal which is a measure of y axis accelerometer bias in response to said sum signal of said y axis accelerometer;
    means for producing a signal which is a measure of the initial drift parameters about the x axis of a first said rate sensor in response to said sum signal of rotation rate of said first rate sensor about the x axis and to signals which are a measure of earth rate;
    means for producing a signal which is a measure of the initial drift parameters about the y axis of a second said rate sensor in response to said sum signal of that second said rate sensor about the y axis and to said earth rate signals;
    means for producing a signal which is a measure of the initial yaw angle in response to said roll and pitch angle signals, to said difference signals of the angular rate about the x axis of one said rate sensor and of the angular rate about the y axis of the other said rate sensor, to a signal which is a measure of a component of angular velocity due to earth's rotation, and to signals which are measures of the acceleration sensitive drift coefficient of both said rate sensors; and
    means for producing a signal which is a measure of the initial drift rate of said rate sensors about the z axis in response to said pitch, roll and yaw signals, to said component of earth's rate signal, and to said sum signals of the angular rate of each respective rate sensor about its z axis.

3. Apparatus as recited in claim 2 and further comprising means for producing a signal which is a measure of the scale factors about the z axis of said rate sensors in response to signals which measure the rotation of said turntable, and said sum signals about the z axis of rate sensors.

4. Apparatus as recited in claim 3 in which said signals are responsive to instrument temperature and further comprising means for generating a temperature signal and for modifying said other signals in response to said temperature signal.

5. Apparatus recited in claim 4 and further comprising means for storing said signals for use during the operative mode of said apparatus.

6. Apparatus as recited in claim 5 and further comprising:
    means for continuously modifying the angular rate signal about said x axis from said first rate sensor to remove instrument drift rate errors;
    means for continuously modifying the angular rate signal about said y axis from said second rate sensor to remove instrument drift rate errors;
    means for resolving earth's rate signals into components about said x, y, and z axes;
    means for subtracting said earth's rate signal components from the respective modified angular rate signals; and
    means for producing direction signals which are measures of the rotation of said instruments about said reference coordinate axes including means responsive to said initial pitch, roll and yaw angle signals, continuously to update said means for producing direction signals, and means for resolving said updated signals to produce updated pitch, roll and yaw angle signals.

7. Apparatus as recited in claim 6 and further comprising feedback means for bounding errors in the pitch and roll angle signals.

8. Apparatus as recited in claim 7 in which said bounding signals are pitch and roll signals obtained in response to said accelerometer signals.

9. Apparatus as recited in claim 8 and further comprising logic means for selectively disconnecting and reconnecting said bounding signals in response to the magnitude of said pitch and roll angles and to vehicle acceleration signals.

10. Apparatus as recited in claim 9 in which said bounding means is disconnected in said x channel in response to either the pitch angle signal or the y axis vehicle acceleration signal exceeding predetermined thresholds;
said bounding means is disconnected in said y channel in response to either the roll angle signal or the x axis vehicle acceleration signal exceeding predetermined thresholds;
said x channel bounding means is reconnected in response to both the pitch angle signal and the y axis vehicle acceleration signal being below predetermined thresholds; and said y channel bounding means is reconnected in response to both the roll angle signal and the x axis vehicle acceleration signal being below predetermined thresholds.

11. A method for determining the initial angular orientation of a first Cartesian set of rate sensor and accelerometer instrument axes relative to a second set of reference axes and for determining the bias errors of said rate sensors and accelerometers, comprising:
positioning the sensing axes of said rate sensors and accelerometers in a first predetermined position about a predetermined first axis of said first set of axes, designated zero degrees, and reading the output signals of said gyroscopes and accelerometers;
turning said rate sensors and accelerometers 180 degrees about said first instrument axis;
re-reading the output signals of said rate sensors and accelerometers; and
adding and subtracting said output signals in the 180 degree position to and from said signals in the zero degree position to obtain sum and difference signals which are functionally related to the angles between the two said sets of axes and to the bias errors and scale factors of said rate sensors and accelerometers.

* * * * *